United States Patent [19]

Howard, III

[11] Patent Number: 4,624,068
[45] Date of Patent: Nov. 25, 1986

[54] SPEARPOINT ASSEMBLY

[75] Inventor: Harland V. Howard, III, Largo, Fla.

[73] Assignee: Panama Breakaway, Inc., Bethel Park, Pa.

[21] Appl. No.: 804,568

[22] Filed: Dec. 4, 1985

[51] Int. Cl.⁴ ............................................. A01K 81/04
[52] U.S. Cl. .............................................................. 43/6
[58] Field of Search ........................................... 43/6, 5

[56] References Cited

U.S. PATENT DOCUMENTS

| 2,745,204 | 5/1956 | Myers | 43/6 |
| 2,833,266 | 5/1958 | Mares | 43/6 |
| 3,045,659 | 7/1962 | Malcolm | 43/6 |
| 3,071,883 | 1/1963 | Merz | 43/6 |
| 3,090,151 | 5/1963 | Stewart | 43/6 |
| 3,766,678 | 10/1973 | Reaves | 43/6 |

FOREIGN PATENT DOCUMENTS 411731  6/1945  Italy ............................................. 43/6

Primary Examiner—Gene P. Crosby
Attorney, Agent, or Firm—David H. Semmes; Warren E. Olsen

[57] ABSTRACT

An improved spearpoint of the type characterized by a smoothly extending single transverse barb, at its proximate end, and a circular taper to a point, at its distal end, and a spearshaft adaptor that will not jam within the spearpoint. A selectively connected cable ring loop assembly allows the spearpoint freely to break away by rotating out of the exit wound, while enabling the distal end of the spearpoint to be connected to the cable, for retrieval.

8 Claims, 4 Drawing Figures

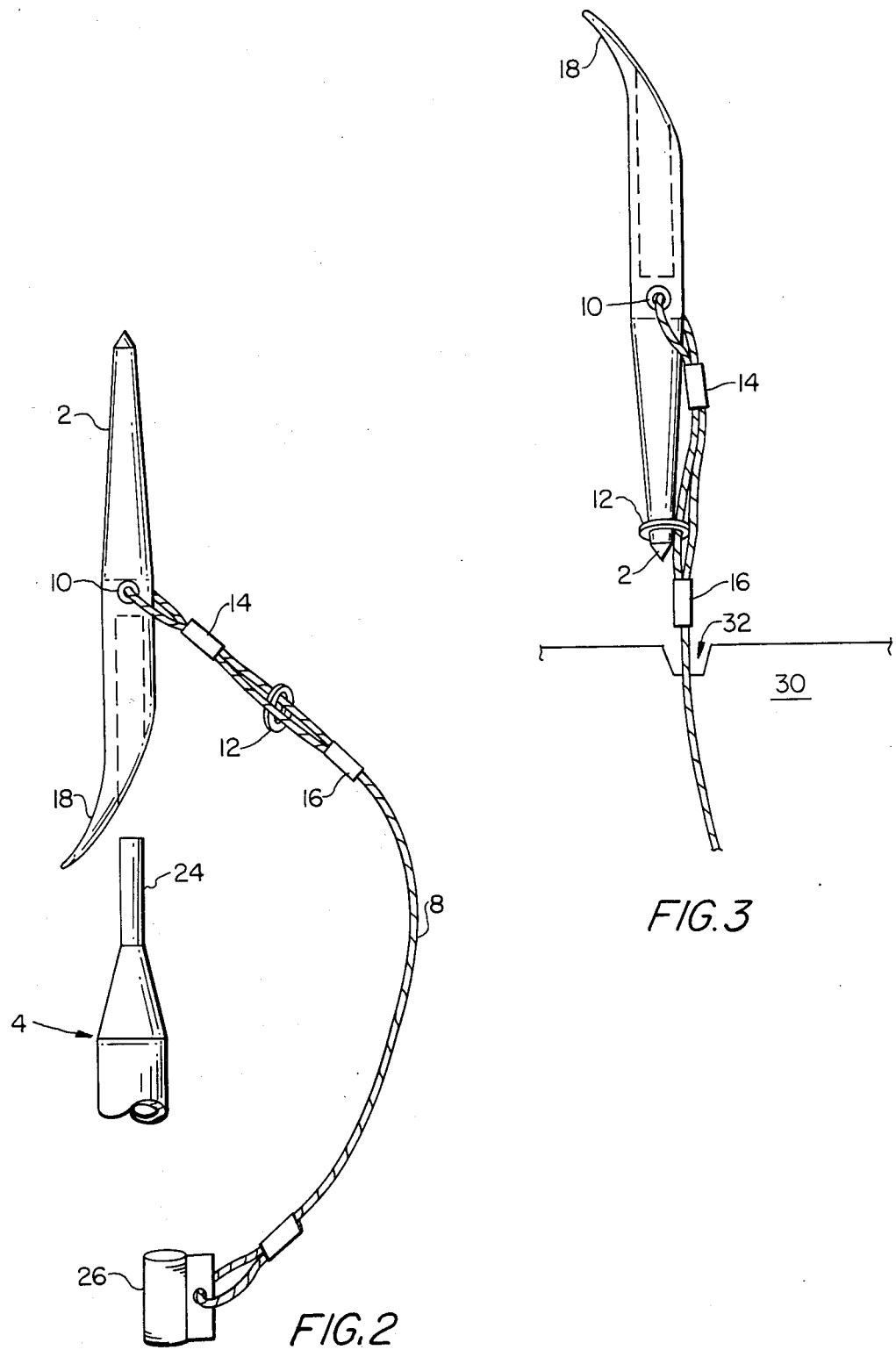

SPEARPOINT ASSEMBLY

BACKGROUND OF THE INVENTION

1. Field of the Invention

A spearpoint with adaptor for use in spear fishing, and particularly with rubber-strap type of spear fishing guns.

2. Brief Description of the Prior Art

Various devices for throwing a fishing gear, either by means of compressed gas or rubber tension straps, are known. The present invention relates to the spearshaft, and has general applicability to all forms of spear guns, though the present invention has particular utility with the most common. rubber strap form of spear guns, such as the Swim Master ®, manufactured by Voit. Representative of prior art spearpoints, and their connection to a spear shaft, are illustrated by the U.S. patents, as follows:

MARES, U.S. Pat. No. 2,833,266
MALCOLM, U.S. Pat. No. 3,045,659
MERZ, U.S. Pat. No. 3,071,883

The present invention categorically is distinguished from such prior art by a cooperation among three (3) characteristics which results in an operation significantly improved over any prior art forms of spearpoint and spearshaft combination. Firstly, the adaptor interface facilitates release of the spearpoint, to eliminate shaft breakage. Second, the spearpoint itself is configured with a smooth taper and a single barb. Thirdly, a cable and ring assembly is provided, to enable a separated spearpoint to be retrieved back through the wound of the prey with great speed and ease.

Single barb spear points broadly are known in the prior art, and one such design is illustrated by the patent to MALCOLM. Spear shaft adaptors having non-tapered shafts to fit into non-tapered spearpoint bores also broadly are known, as shown by the patent to MARES. Further, it is also known in the prior art to use a flexible cable beween a spearpoint and an adaptor. The separation of the spearpoint from the adaptor must occur immediately after the prey has been speared, so that the reaction of the prey does not break the slender spear shaft, but rather allows the shaft to slide out of the entrance wound. For example, the patents to MALCOLM and MERZ illustrate a tether cable which connects the spearpoint, which remains outside the exit wound, and the spearshaft, which should wind up outside the entrance wound.

However, it should be appreciated that significant functional disadvantages occur from relatively subtle structural aspects of spearpoint and spear shaft design. For example, MERZ illustrates a tapered adaptor that fits into a tapered spear point so that, upon impact, a wedging effect occurs between the adaptor and spearpoint, and the two parts tend to jam together, preventing quick release as the prey reacts to the wound. It has been a common experience for the inventor to discover that the repeated wedging action splits such a spearpoint, after a relatively short period of use. While MARES illustrates an adaptor/spearpoint interface which does not include a taper, MARES in turn requires a short, internal tether cable, wherein cable crimps (hidden from view) are subject to great stresses, and are not available for inspection to indicate an imminent failure. The MARES approach is for a double-barb design, which will not require the spearpoint to turn sideways as it exits the prey. MARES essentially does not allow a large separation distance between the adaptor and the spearpoint. It should also be appreciated that if a fish or similar prey has a body width thicker than the length of the short cable shown by MARES, the adaptor and shaft will remain within the wound. The MERZ interface will tend to jam, destroying the possible advantage of a spearpoint capable of accelerating laterally, to ensure divergence from the axial path which the spearshift momentum causes it to follow. Neither prior art reference discusses how turning effects cooperate with the adaptor/spearpoint interface, or otherwise address back-travel of the spearshaft out of the entrance wound. Moreover, none of these prior art spear points are configured also to allow a selective spearpoint positioning, to ensure a quick reverse retrieval, out of the prey.

In summary, the prior art has failed to recognize how single-barb spearpoint design may be mounted and tethered to guarantee both a breakaway action and a quick retrieval action. Applicant has discovered that not only must a single barb breakaway spearpoint be mounted upon a non-tapered spearshaft adaptor element, but that when the spearpoint has a hole transversely extending through its approximate center of gravity, a loop and ring arrangement on the tether cable can be used to allow retrieval of the spearpoint, simply by an axial pull upon the cable from a point outside the entrance wound into the prey.

SUMMARY OF THE INVENTION

The object of the present invention is to provide a spearpoint design which not only breaks away immediately from an adaptor, (so that the spearshaft itself will slip back ouside the entrance wound of the prey, and not be subject to breakage), but also to provide such a spear point with a selective connector means for retrieval. The selective connector means does not oppose rotation of the spearpoint as it passes through and out of the prey, and enables retrieval of the spearpoint without binding inside the wound caused by passage of the spearpoint.

The preferred embodiment of the present invention provides a selective connector means beween the cable and the distal end at the breakaway spearpoint which is simple to manipulate, but still very securely maintains the spearpoint leading edge substantially coaxial with cable tension forces being exerted by an operator pulling on the cable, from a location outside of the entrance wound. The preferred embodiment of the invention employs an elongated, tapered spearpoint having a cable attachment that comprises a transverse aperture perpendicular to the lateral offset of the single barb and located proximate to the center of gravity of the spearpoint. Hence, when a stainless steel cable has a first loop through the spearpoint aperture and a second loop adjacent thereto, a steel ring secured upon the second loop is allowed longitudinally to move with respect to the cable, and selectively engage over the distal end of the spearpoint. When the ring is so engaged, the longitudinal axis of he spearpoint is positioned substantially colinear with the tensile forces exerted by the cable, as the spearpoint is being retrieved through the wound.

In order to ensure the initial separation of a spearpoint from spearshaft adaptor, the adaptor is characterized by an internal thread at its proximate end, with its distal end comprising an elongated, non-tapered male section to mate loosely within an internal bore at the proximate, or rear, end of the longiudinally extending spearpoint. The single barb configuration of the spearpoint extends in a first transverse direction, and preferably the cable first loop and second loop/ring assembly lies on the side of the spearpoint opposite to the transverse extension of the barb. In this manner, there is a dynamic balancing of the entire assembly, when passing through the prey and turning sideways out of the exit wound. As the spearpoint is urged to turn sideways by the action of the single barb, the cable and holding assembly attached thereto will be urged against the convex, trailing edge of the spearpoint barb, and facilitate a smooth following of the cable second loop, ring assembly through the exit wound.

Further features and objects of the invention will become more apparent hereinafter, wherein a preferrd embodiment is disclosed with reference to the accompanying dawings.

BRIEF DESCRIPTION OF THE DRAWINGS

FIG. 2 is a left side, elevation view according to FIG. 1 showing, in explosion view, the separation of the main components of the present invention as it occurs during an intended use;

FIG. 3 is a right side elevation view of a spearpoint engaging a selective connector means, prior to retrieval back through the exit wound;

DESCRIPTION OF THE PREFERRED EMBODIMENT

Figures 1, 4:
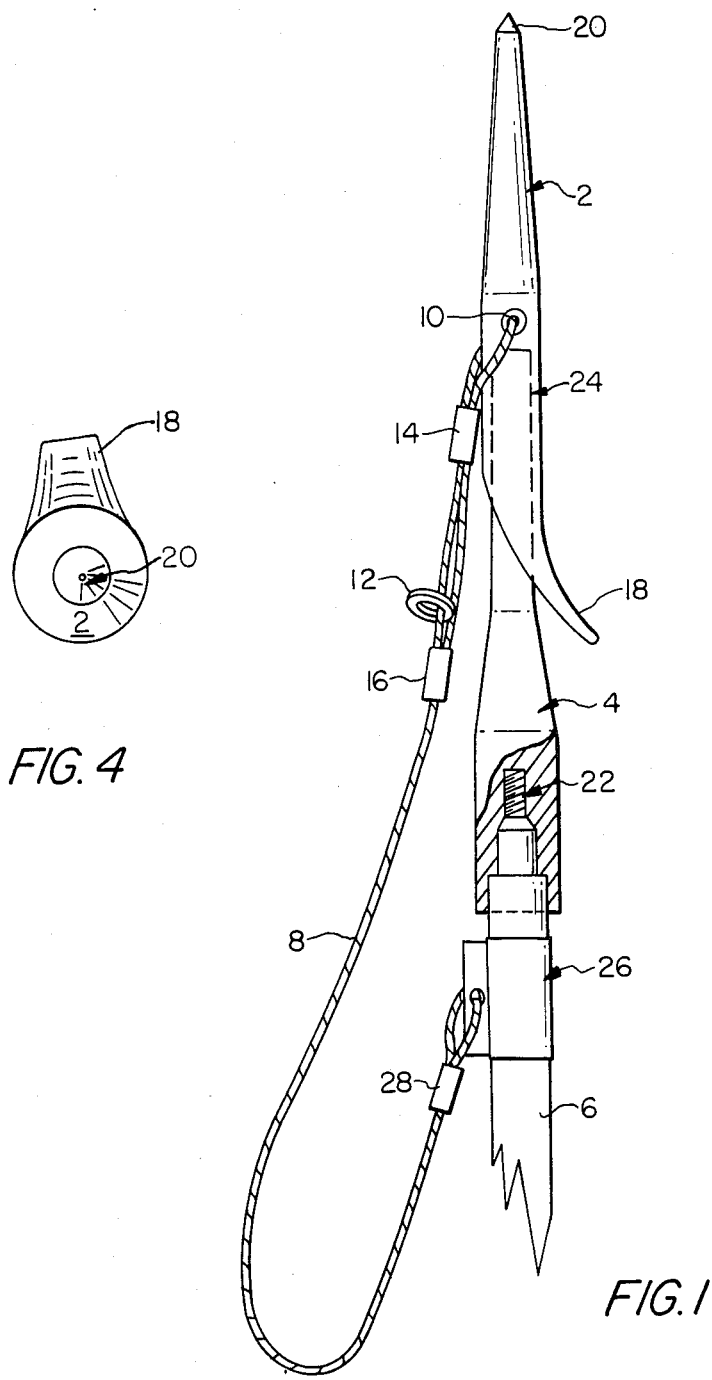
FIG. 1 is a right side elevation view, in partial section, showing a preferred embodiment for a spearpoint and adaptor assembly, according to the teachings of the present invention.
FIG. 4 is a front view of the spearpoint, looking axially at the tip of the spearpoint.

The preferred embodiment comprises three (3) essential elements, which cooperate together to facilitate not only effective breakaway of the spearpoint from the shaft, but also effective retrieval of the separated spearpoint through the wound of the prey. A single barb spearpoint, 2, fits over an adaptor, 4, with the spearpoint being tethered to a shaft, 6, through the elongated stainless steel cable, 8. The illustrated spearpoint has an overall length of approximately 4 inches, and is constructed from a right circular cylinder blank of stainless steel, with an approximate diameter of ⅜ inches. The blank is provided with a 5 degree taper between its approximate mid point and a leading edge at the distal end, 20, a sharp point configuraion. The blank further internally is axially drilled from its proximate end and then a trailing edge is transversely bent to create a maximum lateral offset of approximately ¼ of an inch, measured from the outside surface of the blank, to the rear tip of the barb. Prior to the bending, a triangular section of steel is removed, and after bending a taper to the bab, 18, is defined, as shown in FIGS. 1 AND 4. Accordingly, the 4 inch spearpoint has a midpoint transverse dimension of ⅜ of an inch, with a lateral offset dimension to one side, of an additional ¼ inch. At the approximate midpoint or center of gravity for the spearpoint, an approximate ⅛ inch diameter, countersunk aperture, 10, is drilled perpendicular to the first transverse dimension in which the single barb is offset.

As further illustrated in FIG. 1, a first loop and a second loop in the cable is defined, and a steel ring, 12, is located within the second loop, to enable the ring to slide down the cable, to the axial vicinity of the barb trailing edge, 8. The steel ring preferably has an i.d. of ¼ inch, an o.d. of ⅜ inch, and is approximately 1/16 inch thick. The ring is contained for motion along the cable by a first brass sleeve, 14, and a second brass sleeve, 16. As shown in FIG. 1, the ring and sleeve arrangement on the cable defines a selective connector mechanism that will drape over the transverse side opposite to the spearpoint barb, 18, before separation of the spearpoint and adaptor. With respect to the configuration of FIG. 1, a rightwardly turning motion of the spearpoint is created as the barb, 18, exists from the prey, thereby tending to urge the cable and ring against the smooth, concave surface of the spearpoint barb, 18. Hence, large entrance wounds in the prey are avoided, since the overall slender elongated taper of the point is not significantly defeated by the effects of the trailing cable and selective connector, which tend to drape against the barb trailing edge.

FIG. 2 schematically illustrates, in partial explosion view, that the adaptor, 4, has a distal end, 24, which is a substantially elongated non-tapered transverse dimension. A non-tapered bore extending exially inside the spearpoint from its proximate end is sized loosely to fit over the adaptor distal end, 24, in a non-binding fashion. As shown in FIG. 1, the transition section of adaptor, 4, between the non-tapered distal portion, 24, and the enlarged proximate end does not contact any portion of the spearpoint, 2. FIG. 1 further illustrates how the enlarged proximate end of the adaptor, accepts an externally threaded portion at the distal end, 22, of spearshaft, 6. The internal threading within the adaptor accepts an externally threaded portion at the distal end, 22, of spearshaft, 6. The internal threading within the adaptor proximate end may be easily configured to accommodate any one of three conventional spearshaft threads. Most commonly, spearshafts have a ⅜ inch o.d. shaft with a 12×24 thread. A common spear shaft of this format is the Swim Mater ®, marketed by Voit. Manifestly, other conventional internal threads, such as 5/16 inch o.d. shafts with 6 mm threading or 5/16×24 threading can easily be cut into the adaptor.

FIG. 3 schematically illustrates the situation after the spearpoint has broken away from the adaptor and its attached shaft, wherein only the cable, 8, remains substantially within the wound defined within the prey, 30. The illustrated exit wound, 32, is distensible, but still presents a barrier to retrieval of the spearpoint, 2. A significant advantage of the present invention is the ability to quickly manipulate the steel ring, 12, over the distal end of the spearpoint, 2, as shown in FIG. 3. The first brass sleeve, 14 and the second brass sleeve, 16, are positioned to enable a large travel direction for the ring along the cable, with that dimension and the ring being configured to enable an easy engagement over the spearpoint leading edge, and a frictional tightening as the ring moves upwardly on the spearpoint taper. It should also be appreciated that when tensile forces are applied to the cable, 6, while the spearpoint is configured as in FIG. 3, the spearpoint is guided back through the exit wound, 32, and ring contact with the wound urges the ring more tightly against the taper of the spearpoint, 2. The overall structure thereby defeats any tendency for the ring, 12, to be dislodged forwardly and over the distal end of the spearpoint, and jamming of the spearpoint within the wound.

The preferred cable is a 1/16 inch o.d. stainless steel braid, of approximately 600 pound test. The preferred length of the cable is 12 inches, with the cable proximate end clamped by a brass sleeve, 28, to a conventional collar, 26, which slidably surrounds the spearshaft, below the adaptor, 4. Rubber-strap spear gun firing mechanisms often include provision for initially holding the collar, 26, rearwardly, so as to maintain a connection between a spearpoint and its adaptor. Upon firing of the spear, the forward momentum of the assembly maintains that mating connection between the adaptor and the spearpoint, without need for any effect from the cable. Upon impact, the spearshaft distal end invariably passes significantly into the fish or other prey, and the subsequenty violent reaction of the fish will break a spearshaft that remains in the wound. Upon separation, the shaft is able to slide out of the prey, and the cable then pulls the spearpoint against the exit wound. The concave surface of the barb first engages the exit wound, which then rotates the spearpoint oppositely to the first rotation direction which caused the spearpoint to break away fom the adaptor. The spearpoint thus winds up substantially perpendicular to the cable, and flat against the exit wound. As shown in FIG. 3, it then requires only the simple manipulation of pulling a short length of cable out the exit wound, and a further rotation of the spearpoint in the second direction, until the distal end is slippd inside the steel ring, 12. All further tensile forces in the cable then tend to guide the spearpoint smoothly and accurately back through the exit wound, and out of the entrance wound.

While a preferred embodiment of the present invention has been shown and described, the invention is to be limited solely by the scope of the appended claims.

I claim:

1. In a spearpoint of the type tethered to a spearshaft by a cable and having a pointed distal end and a proximate end that releasably engages with an adaptor connected to the distal end of a spearshaft, the improvement which comprises a selective cable connector means to allow the spearpoint distal end to be rotated about an aperture of the spearpoint through which the cable is connected to said spearpoint, and means to maintain the rotated spearpoint adjacent to said cable, whereby retrieval of the spearpoint through a wound in a speared prey is facilitated.

2. In a spearpoint according to claim 1, wherein the improvement further comprises a spearpoint with a substantially circular midpoint cross-section that tapes to a point at its distal end and said cable connector means which comprises a first loop in said cable which engages through said which is transverse and aperture located proximate to said spearpoint midpoint and a second loop which constrains movement of a substantially circular connector element along said cable, said connector element having an internal diameter which is larger than the diameter of the spearpoint at its distal end and smaller than the diameter of the spearpoint at its midpoint.

3. In a spearpoint according to claim 2, wherein the improvement further comprises a spearpoint proximate end characterized by a single barb with a first surface facing in a first transverse direction thereby to define a concave extension to the spearpoint outer surface and the obverse barb surface facing in a second transverse diection thereby to define a convex extension of the spearpoint outer surface wherein, further, said transverse aperture substantially is perpendicular to the first and second transverse directions and with the cable connector means being adjacent to the spearpoint surface.

4. In a spearpoint according to claim 1, wherein the improvement further comprises a spearpoint having a substantially circular midpoint cross-section which becomes, at its proximate end, a single bath having a concave surface facing in a first transverse direction and a convex surface facing in a second transverse direction, obverse to the first and said proximate end further comprising an opening to a longitudinally extending internal bore that is non-tapered, and adapted to accept, without binding, a non-tapered distal end portion of an adaptor which in turn has a proximate end adapted to be mounted upon the distal end of a spearshaft.

5. An improved spearpoint assembly comprising, in combination:
  (i) a spearpoint with an elongated longitudinal dimension that extends between a pointed distal end and a proximate end that further comprises a single barb extending in a first transverse dimension and an internal bore; and
  (ii) a spearshaft adaptor with a distal end adapted releasably to engage within the spearpoint internal bore; and
  (iii) a tethering means adapted to connect the spearpoint to a spearshaft which comprises a flexible cable with a proximate end adapted for attachment to a spearshaft and a distal end further comprising means to connect the cable at an intermediate longitudinal location on the spearpoint; and
  (iv) means selectively to connect the spearpoint distal end with a portion of the cable spaced from the cable distal end.

6. The combination of claim 5 wherein the spearpoint is substantially circular in cross-section and tapers from said intermediate location to a point at its distal end, wherein said means selectively to connect the spearpoint distal end with the cable comprises a substantially circular element that is constrained for motion along a portion of the cable and is adapted to be engaged over said spearpoint and tightly against the tapered surface extending therefrom.

7. The combination of claim 6 wherein said spearshaft adaptor distal end comprises an elongated, right cylindrical surface with a diameter smaller and a length larger than the corresponding diameter and length of a longitudinally extending bore opening into the spearpoint from the proximate end thereof.

8. An improved spearpoint and adaptor assembly characterized by a longitudinally extending spearpoint with a pointed distal end, a proximate end further comprising a single barb extending in a first transverse direction and a non-tapered longitudinal bore adapted releasably to accept a non-tapered, longitudinally-extending distal end of an adaptor which further comprises a proximate end that in turn is adapted to be mounted upon the distal end of a spearshaft, wherein the improvement comprises a transverse aperture in the spearpoint that is located proximate to the center of gravity of said spearpoint and which extends substantially perpendicular to the transverse direction of said single barb, wherein further the first end of a flexible cable is defined with a first loop through said aperture and an adjacent second loop, wherein a connector element is adapted for a limited travel along said cable by said second loop and is sized to enable the spearpoint distal end to be held adjacent to a portion of said cable proximate the second loop for purposes of retrieval of the spearpoint, back though the wound in a speared prey.

* * * * *

REEXAMINATION CERTIFICATE (987th)
United States Patent [19]
Howard, III

[11] B1 4,624,068
[45] Certificate Issued  Jan. 3, 1989

[54] SPEARPOINT ASSEMBLY

[75] Inventor: Harland V. Howard, III, Largo, Fla.

[73] Assignee: Panama Breakaway, Inc., Bethel Park, Pa.

Reexamination Request:
No. 90/001,379, Nov. 18, 1987

Reexamination Certificate for:
Patent No.: 4,624,068
Issued: Nov. 25, 1986
Appl. No.: 804,568
Filed: Dec. 4, 1985

[51] Int. Cl.⁴ .............................. A01K 81/04
[52] U.S. Cl. ...................................... 43/6
[58] Field of Search .............................. 43/6

[56] References Cited

U.S. PATENT DOCUMENTS

| | | | |
|---|---|---|---|
| 2,745,204 | 5/1956 | Myers | 43/6 |
| 2,833,266 | 5/1958 | Mares | 43/6 |
| 3,045,659 | 7/1962 | Malcolm | 43/6 |
| 3,071,883 | 1/1963 | Merz | 43/6 |
| 3,090,151 | 5/1963 | Stewart | 43/6 |
| 3,766,678 | 10/1973 | Reaves | 43/6 |

FOREIGN PATENT DOCUMENTS 411731  6/1945  Italy ........................... 43/6

OTHER PUBLICATIONS

U.S. Divers Co., 1963 "Aqua-Lung" Catalog, Part No. 75-3-05, published 1963.
Aqua-Craft Inc. 1971 "Complete Catalog of Skin Diving Accessories", published 1971.
"Shallow Water Diving and Spearfishing", a book published in 1955 by Hilbert Scneck and Henry Kendall.

*Primary Examiner*—Gene P. Crosby

[57] ABSTRACT

An improved spearpoint of the type characterized by a smoothly extending single transverse barb, at its proximate end, and a circular taper to a point, at its distal end, and a spearshaft adaptor that will not jam within the spearpoint. A selectively connected cable ring loop assembly allows the spearpoint freely to break away by rotating out of the exit wound, while enabling the distal end of the spearpoint to be connected to the cable, for retrieval.

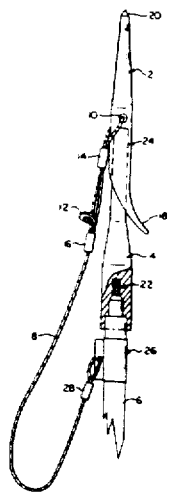

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2, 3 and 8 is confirmed.

Claims 1 and 4–7 are cancelled.

* * * * *